Feb. 14, 1939.  W. L. McNAMARA ET AL  2,147,307
CHARGE FORMING MACHINE
Filed June 20, 1936
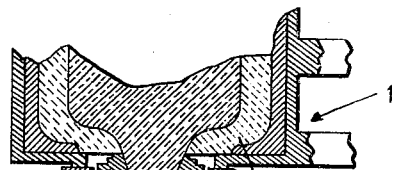
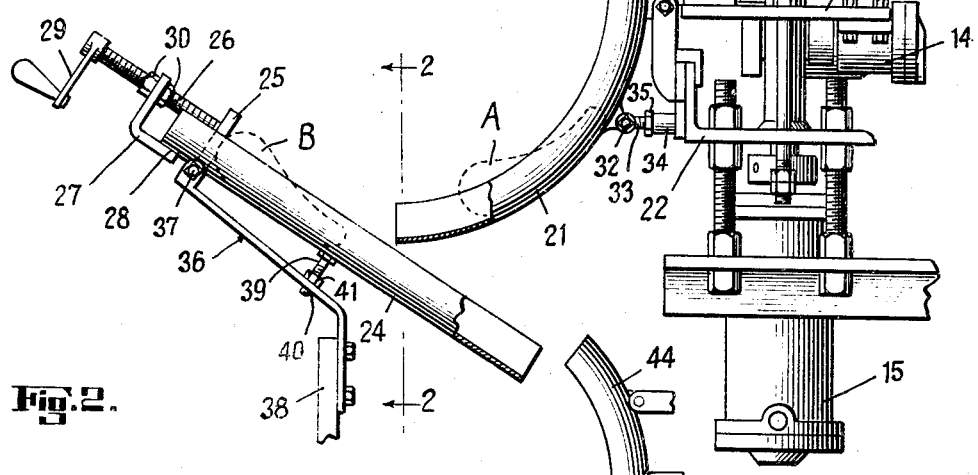
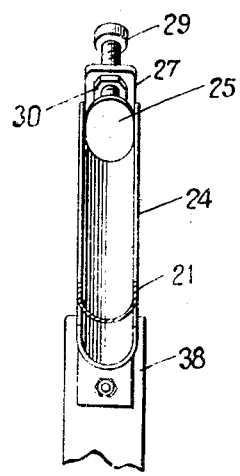
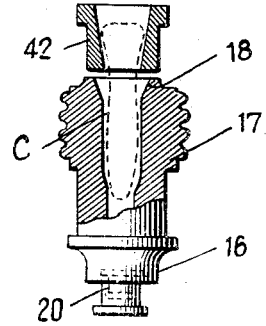
INVENTOR
William L. McNamara
and John W. Errett
By Norman J. Holland
ATTORNEY Patented Feb. 14, 1939

2,147,307

UNITED STATES PATENT OFFICE 2,147,307

CHARGE FORMING MACHINE

William L. McNamara and John W. Errett, Connellsville, Pa., assignors to Capstan Glass Company, Connellsville, Pa., a corporation of Delaware Application June 20, 1936, Serial No. 86,384

8 Claims. (Cl. 49—55)

The present invention relates to the glass feeding art and more particularly to a device and method for shaping charges of molten glass and delivering the charge to a fabricating machine or the like.

Glass containers such as bottles or the like are usually formed by automatic fabricating machines which receive charges or gobs of glass from a feeder adapted to regulate the size and shape of the charges. Such fabricating machines may comprise a blank or parison mold for forming the neck of the container or bottle and for partially shaping the body of the container, and a blow mold wherein the body is blown or otherwise shaped into its desired form. To facilitate getting the charges into the molds, the blank mold is usually supported on a mold table in inverted position so that the open bottom of the blank mold extends upwardly and acts to guide the lower end of the charge into the neck part. In the manufacture of bottles having a narrow neck, considerable difficulty has been experienced in getting the charges into the neck mold. This is due to the fact that the glass gob begins to chill as it leaves the feeder and will not readily pass into a mold having an internal diameter smaller than the external diameter of the charge. Also, the lower end or head of the charge normally has a greater diameter than the upper end or tail of the charge, and if the charges are severed from a stream of glass flowing from the feeder by a shearing device, the head end is blunt and will not fit properly into the neck of the mold. Another difficulty is that the lower end of the charge, since it is out of the feeder and chilled a longer time than the upper portion of the charge, has a tendency to lose its plasticity, making it more difficult to get the glass properly into the neck mold.

In order to minimize these difficulties, devices have been developed which invert the charges of glass as they leave the feeder so that the tail end of the charge is inserted into the neck of the mold. These devices have not been entirely successful because they failed to provide means for properly shaping the charges prior to inverting them and failed to further shape the charges during their delivery to the molds. These devices merely inserted the more plastic end of the charge into the neck of the mold, but did not form a charge adapted to provide a suitable parison. A further difficulty with these devices is that they cannot be readily adjusted to accommodate charges varying in size and weight and cannot be adjusted to regulate the time required by the charge to be delivered from the feeder to the mold.

The present invention is an improvement over the devices utilized heretofore and aims to improve the feeding of charges of glass by shaping the charges prior to inverting them, maintaining the desired features of the shape and further shaping the charges during delivery from the initial shaping means to the molds. The invention further aims to provide an improved inverting device which is simple and inexpensive, can be readily adjusted and is adapted to accommodate charges varying in shape and weight.

An object of the present invention is to provide a simple, inexpensive device for delivering charges of glass to fabricating machines.

Another object of the invention is to provide a device for shaping charges of glass.

Another object of the invention is to provide a device for tapering one end of the charge and delivering the tapered end to a neck mold.

Another object of the invention is to improve the manufacture of glass containers and particularly narrow neck containers.

Another object of the invention is to provide a simple, inexpensive device for inverting charges of glass adapted to be regulated in timed relation with respect to the feeder and the fabricating machine.

Another object of the invention is to provide an improved method for feeding charges of glass to fabricating machines.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a side elevational view, partly in section, illustrating a preferred embodiment of the present invention; and Fig. 2 is a sectional view taken along the line 2—2 on Fig. 1.

Referring more particularly to the drawing, there is shown a feeder 1 having a forehearth or spout 2 provided with a bushing or orifice 4 for delivering molten glass adapted to be shaped and thereafter severed by shears 5 or the like to form gobs or charges of glass of predetermined size and weight for the molds of a fabricating machine.

Any suitable means (not shown herein) may be utilized for shaping the stream or charges, for example, a reciprocating plunger or pneumatic means for subjecting glass to different pressures may be mounted in the feeder spout for accelerating and retarding the flow of the stream to give it a desired shape. Such devices preferably also cause "necking" of the stream above the charge to facilitate shearing the charge from the stream. Several devices for accomplishing this are illustrated in a copending application owned by the assignee hereof, Serial No. 56,417, filed December 28, 1935.

In addition, a suitable gob shaping mechanism may be utilized for shaping the charges, an embodiment of which is described in detail in the copending application identified above.

Such a mechanism is also illustrated herein and may comprise a partible cup 7 formed by a pair of mold members 9 mounted on suitable arms 10 for opening and closing the cup. The arms may be mounted on shafts 11 pivoted on a platform or other suitable support 12. An air cylinder 14 and suitable connecting means may be provided for rotating the shafts 11 to oscillate the arms 10 to open and close the cup. Preferably, the cup is closed to receive the lower end of the stream and shape the stream while the platform is being lowered by a pneumatic cylinder 15 or the like to elongate the stream and provide a charge with a tapered tail end. During downward movement, the cup may be opened to permit the stream to fall freely by gravity to cause further necking of the stream above the charge to facilitate shearing the charge from the stream. Thereafter, the platform may be moved upwardly and the cup closed to receive the next charge. The shears may be operated by any suitable device adapted to operate in timed relation with respect to the charge forming cup and the fabricating machine, and any suitable means may be provided for operating the above mechanisms in synchronized relation.

The present invention contemplates feeding the charges to a fabricating machine having a rotatable table provided with suitable devices for supporting a neck mold 16 and a blank mold 17 in inverted position so that the charge may be inserted into the open bottom 18 of the blank mold. Since the diameter of the mold cavity of the neck mold is relatively small, difficulty is experienced in delivering the lower end of the charge into the neck mold. If the head or blunt end of the charge is delivered to the neck portion of the mold, the charge will not be properly distributed in the neck mold because the head end has been chilled and is less plastic. Also, the blunt end is relatively thick and is stopped by the shoulder or constriction at the neck to prevent it from flowing to the rim or mouth portion where the cap engaging means usually are located. Consequently, the rim and the cap attaching zone of the bottle will not be formed properly, thus making the bottle unsalable.

In order to overcome these difficulties, the present invention contemplates forming a charge or gob of glass having a tapered tail end of relatively small diameter, reversing or inverting the charge and inserting the tail end first into the molds. To accomplish this, a slide or guide member 21 is mounted on a stationary bracket 22 beneath the cup 7 adapted to receive a gob of molten glass discharged from the cup substantially at the upper end of the slide and guide the charge downwardly thereon. Preferably, the slide is curved along its length with its upper end disposed tangentially with respect to a vertical plane so that the gob strikes the slide tangentially and is not distorted. Likewise, the lower end of the slide may be substantially tangentially disposed with respect to a horizontal plane to facilitate delivering the charge to a second slide 24 about to be described. Preferably, the slides 21 and 24 are arcuate or substantially semicircular in cross-section (Fig. 2) to provide a curved trough or channel conforming to the circular shape of the sides of the gobs, whereby the cross-section of the gob is not distorted as it is guided upon the slides.

Preferably, the slide or guide member 24 is inclined in an opposite direction with respect to the slide 21 and is positioned beneath the lower end of the slide 21. The lower portion of the slide 24 extends downwardly beneath the slide 21 while the upper end thereof extends upwardly from the lower end of the slide 21 to permit a gob delivered from the slide 21 to slide upwardly along the slide 24 for a slight distance. The slide or guide member 24 preferably is straight along its length and is inclined at an angle of about thirty degrees with respect to a horizontal plane.

In order to regulate the distance a gob or charge slides upwardly upon the slide 24, a suitable bumper or contact member 25 is provided substantially at the upper end of the slide. The bumping member is adapted to stop the gob or charge and at the same time, if desired, is adapted to slightly flatten the end of the gob which is desirable when forming a bottle or other container. The bumping member 25 may be adjustably mounted with respect to the upper end of the slide 24 to regulate the distance the gob will slide and to regulate the impact of the gob coming in contact therewith. To accomplish this, the bumping member is mounted on a threaded rod 26 extending through a threaded aperture in a bracket member 27 secured to the upper end of the slide 24 at 28 and the free end of the rod 26 is provided with a crank or hand wheel 29 for rotating the rod to change the position of the bumping member along the length of the slide. Suitable locking nuts 30 may be threaded on the rod to lock the rod in a desired adjusted position.

Preferably, the slides 21 and 24 are adapted to be adjusted to predetermine their angle of inclination and regulate the speed at which the charges descend thereon. To accomplish this, the slide 21 is pivotally mounted at its upper end at 31 to the bracket 22 and the middle portion thereof is connected at 32 to a threaded member 33 extending into a sleeve 34 on the bracket carrying a nut 35 for adjusting the position of the threaded member 33. The slide 24 is adjustably mounted by pivotally connecting its upper end to a bracket 36 at 37, which may be mounted on a fixed support 38. The middle portion of the slide may be adjustably supported by a pin or bolt 39 threaded into the bracket 36 at 40. The pin 39 is adapted to be moved upwardly and downwardly with respect to the bracket to tilt the slide at a desired angle and may be held in adjusted position against accidental movement by a lock nut 41. In this manner, the slides may be tilted at any desired angle to regulate the time required for a gob to be delivered from the charge forming cup 7 to the mold.

After the charge or gob has been delivered to the slide 24 and has contacted the bumping member, the head end faces upwardly and the tail end faces downwardly. Thereafter, the inverted gob slides downwardly along the guide member 24 and drops into the blank mold 17. In order to guide the charge into the mold, a funnel 42 may be positioned above the mold opening and a shield or guide member 44 may be mounted adjacent to the lower end of the slide 24 to direct the charge to the funnel. The funnel 42 may also be utilized for shaping further the charge being delivered.

To prevent the slides from being overheated, suitable spraying devices may be provided adapted to spray oil or water thereon. Also, the cup may be cooled to prevent it from being overheated.

In operating the charge inverting mechanism, and the devices associated therewith, the forming cup operating mechanism and the mold table are first synchronized and the feeder is adjusted to deliver charges or gobs of glass having a predetermined size and weight at desired intervals. Thereafter, the inclination of the slides 21 and 24 is adjusted so that the gobs slide thereon at a desired rate of speed and the bumping member 25 is adjusted to stop upward movement of the gob on the slide at a desired point.

After these preliminary steps have been performed, the feeder and fabricating machine are operated. The stream of glass leaves the bushing and is supported and shaped into a charge by the cup 7 while the cup is moved downwardly to cause necking or tapering of the stream above the charge. Another suitable means may be utilized for making the stream, for example, a reciprocating plunger or pneumatic means. When the cup is moved into its lower position, the cylinder 14 or other operating means are effective to open the cup, whereby the stream is freely suspended to cause further necking of the stream. The shears 5 are then operated to sever the charge from the stream at the necked portion, whereby the charge drops by gravity and is delivered to the slide 21 as shown at A. The charge then slides downwardly and due to the curved contour of the slide 21 is projected or flipped tangentially outwardly upon leaving the lower end of the slide and is delivered to the slide 24 as indicated at B. The inertia of the gob causes it to slide upwardly until the head end of the charge contacts the bumping which flattens the head end. The proper amount of flattening can be obtained for any type of container. Thereafter, the charge proceeds to move downwardly on the slide in an inverted position, drops into the funnel 42 and into the blank mold, tail end first, as shown at C. The tail end of the charge, by being substantially tapered and having a small diameter, is delivered to the neck mold 16 and by being substantially hot and plastic is properly distributed in the neck mold cavity 20. The enlarged head end of the charge tends to force the tail end into the neck mold. After a charge has been delivered the mold table may be rotated to move the mold away and to move another mold into its charge receiving position beneath the funnel.

While the charge inverting device has been described, as being used in connection with the charge forming cup, it will, of course, be understood that it is also adapted to be used with feeders which shape and feed the charges by means of a needle or plunger or by pneumatic means which deliver gobs of glass directly to the slide 21. It will also be understood that the charge inverting mechanism is adapted to be used for making other types of containers or various glass articles.

It will be seen that the present invention provides a simple, practical device for feeding and inverting charges of molten glass and delivering the charges to mold mounted on a fabricating machine. The charges, in this manner, are properly inserted into the molds to insure the formation of perfect ware. The charge inverting device is inexpensive in cost and operation and can be conveniently installed on existing machines. It is readily adjustable, automatic in its operation and does not require attendance by a skilled workman. If a feeder equipped with the inverting mechanism is desired to be operated without inverting the charge, the slide 21 and the shield 44 are removed to permit the charge to fall downwardly into the molds. The parts of the device are rugged in construction and can readily withstand any rough usage to which they may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a device of the class described, the combination of a downwardly extending guide member, a second guide member adjacent to said first guide member and extending downwardly in a direction opposite to said first guide member, a bracket at the upper end of said second guide member having threaded portions therein, a threaded member extending through said threaded portion, a member at one end of said threaded member seated in said second guide member, and means at the other end of said threaded member for rotating said threaded member to change the position of said member seated in said second guide member.

2. In a device of the class described, the combination of an inclined guide member mounted beneath the outlet of a feeder and adapted to receive a charge of glass therefrom, and a second inclined guide member structurally separate and adjacent to and normally in position to receive the charge of glass from said first guide member, said second guide member being inclined in the opposite direction from said first guide member and having its lower end extending below the lower end of said first guide member, said first guide member being curved lengthwise and extending substantially tangentially with respect to said second guide member to invert the charge of glass and permit it to be guided in the opposite direction on said second guide member.

3. In a device of the class described, the combination of an inclined guide member mounted beneath the outlet of a feeder and adapted to receive a charge of glass therefrom, a second inclined guide member structurally separate and adjacent to and normally in position to receive the charge of glass from said first guide member, said second guide member being inclined in the opposite direction from said first guide member and having its lower end extending below the lower end of said first guide member, said first guide member being curved lengthwise and extending substantially tangentially with respect to said second guide member to deposit the charge on said second guide member in inverted position, and means for adjusting the inclination of one of said guide members to determine the distance the charge moves upwardly on said second guide member.

4. In a device of the class described, the combination of an inclined guide member mounted beneath the outlet of a feeder and adapted to receive a charge of glass therefrom, a second inclined guide member structurally separate and adjacent to and normally in position to receive the charge of glass from said first guide member, said second guide member being inclined in the opposite direction from said first guide member and having its lower end extending below the lower end of said first guide member, said first guide member being curved lengthwise and extending substantially tangentially with respect to said second guide member to deposit the charge on said second guide member in inverted position, and means for adjusting each of said guide members independently of the other.

5. In a device of the class described, the combination of an inclined guide member mounted beneath the outlet of a feeder and adapted to receive a charge of glass therefrom, a second inclined guide member structurally separate and adjacent to and normally in position to receive the charge of glass from said first guide member, said second guide member being inclined in the opposite direction from said first guide member and having its lower end extending below the lower end of said first guide member, said first guide member being curved lengthwise and extending substantially tangentially with respect to said second guide member to invert the charge and to direct it to move upwardly on said second guide member and a member mounted in said second guide member for shaping the blunt end of the charge.

6. In a device of the class described, the combination of a charge forming cup, an inclined guide member mounted beneath said cup adapted to receive a charge of glass therefrom, a second inclined guide member structurally separate and adjacent to and normally in position to receive the charge of glass from said first guide member, said second guide member being inclined in the opposite direction from said first guide member and having its lower end extending below the lower end of said first member, said first guide member being curved lengthwise and extending substantially tangentially with respect to said second guide member to invert the charge and to direct it to move upwardly on said second guide member, and means adjacent the upper end of said second guide member for flattening one end of the charge.

7. In a device of the class described, the combination of an inclined slide mounted beneath the outlet of a feeder and adapted to receive a charge of glass therefrom, a second inclined slide structurally separate and inclined in the opposite direction from said first slide, said first slide being curved lengthwise and extending substantially tangentially with respect to said second slide to deposit the charge in inverted position on said second slide and to cause the charge to move upwardly thereon, means on said second slide for stopping the upward movement of the charge, said means being shaped to partially flatten one end of the charge, and means for adjusting the position of said stopping means to determine the amount the end of the charge is flattened.

8. In a device of the class described, the combination of a slide mounted beneath the outlet of a feeder to receive a charge of glass therefrom, a second slide structurally separate and inclined in the opposite direction from said first slide, said first slide being curved lengthwise and extending sustantially tangentially with respect to said second slide to deposit the charge on said second slide in inverted position and to cause upward movement thereof, an abutment at the upper end of said second slide adapted to stop upward movement of the charge, and means for adjusting the position of said abutment with respect to the upper end of said second slide.

WILLIAM L. McNAMARA.
JOHN W. ERRETT.